United States Patent [19]

Basnuevo et al.

[11] Patent Number: 5,541,933
[45] Date of Patent: Jul. 30, 1996

[54] AUTO-DETECTION OF DDS SERVICE AND LINE RATE

[75] Inventors: Rogelio J. Basnuevo; Jorge A. Valdes, both of Miami, Fla.

[73] Assignee: Racal-Datacom, Inc., Sunrise, Fla.

[21] Appl. No.: 60,764

[22] Filed: May 11, 1993

[51] Int. Cl.⁶ .................................................. H04J 3/12
[52] U.S. Cl. .................................. 371/5.5; 370/17
[58] Field of Search ........................... 371/5.1, 5.5, 16.5; 341/50, 51, 59, 60; 327/141, 144, 145; 375/106, 112, 113, 225, 228, 355, 356; 370/82, 84, 85.12, 100.1, 105.1, 17, 99

[56] References Cited

U.S. PATENT DOCUMENTS

| 4,745,601 | 5/1988 | Diaz et al. | 370/110.1 |
| 5,062,104 | 10/1991 | Lubarsky et al. | 370/60 |

OTHER PUBLICATIONS

AT&T Communications Technical Reference Publication No. 62120 dated April 1994 entitled "Digital Data System With Secondary Channel".
AT&T Technical Reference Publication No. 62310 dated Nov. 1987 entitled "Digital Data System Channel Interface Specification".

Primary Examiner—Emanuel T. Voeltz
Assistant Examiner—Edward Pipala
Attorney, Agent, or Firm—William A. Newton; Pedro P. Hernandez

[57] ABSTRACT

Disclosed is a Digital Service Unit (DSU) which, in response to a digital signal from a Digital Data System (DDS) network, uses different techniques for different possible DDS services (include DDS-SC, CC64, and basic DDS services) to determine the type of DDS service providing the digital signal services and the line rates for such services. With respect to DDS-SC service, the DSU utilizes the fact that this DDS-SC service provides network defined frames of data to which the DSU tries establish frame synchronization at different line rates. The DSU also resolves the fact the DDS-SC service and CC64 service have the same 72 KBPS line rate by detecting the presence or absence of a control bit. For Basic DDS service, the DSU monitors the received signal for a plurality of possible invalid conditions. For each line rate, an error counter for that line rate is incremented each time an invalid condition is detected. After all the rates are checked, the DSU selects the line rate of the Basic DDS service with the least number of invalid occurrences.

13 Claims, 6 Drawing Sheets

AUTO-DETECTION OF DDS SERVICE AND LINE RATE

BACKGROUND

1. Field of the Invention

This invention relates to an access device for a digital network such as a digital service unit (DSU).

2. Background of the Invention

The term Digital Service Unit (DSU), as used herein, may in general also embrace combined Digital Service Unit/Customer Service Units (CSU), CSU's, or similar digital network access devices as will be appreciated by those skilled in the art.

In order to achieve higher reliability in data communications at higher speed, many users are converting to all digital networks such as digital data systems (DDS) networks. There are three distinctive services in the DDS network: (i) Basic DDS (also called Standard DDS or DDS I), (ii) DDS-SC (also called DDS II) and (iii) CC64 (also called CC64k Clear), with the first two services including a plurality of line rates. Detailed technical information regarding the various DDS services may be obtained in the various technical specifications published by AT&T and other digital service providers for their digital data systems (e.g. AT&T Communications Technical Reference PUB 62120, 1984).

Typically, in prior DSU designs of the assignee of the present invention, the user/customer needed to manually strap the DSU units to reflect the proper DDS rate/service, such need requiring an experienced person to install the DSU units.

In U.S. Pat. No. 4,745,601 to the assignee of the present invention, in column 8, line 18, it is stated that the service and line rate may be automatically derived from the DDS data stream. Additionally, a number of companies have commercially released DSU units that provide automatic detection of the line rate and service on the DDS network. Hence, automatically detecting the proper DDS rate/service has been implemented in a number of products forming part of the prior art.

SUMMARY OF THE INVENTION

In the preferred embodiment the Digital Service unit (DSU) of the present invention, using different techniques for different DDS services, detects at least one of the different network digital data services which include DDSSC, CC64, and basic DDS services and the line rates for such services. With respect to DDS-SC service, the present invention utilizes network provided and defined frames of digital bits to which the DSU of the present invention tries to establish frame synchronization at different data line rates. The present invention also resolves the ambiguity that the DDS-SC service and CC64 service have the same 72 KBPS line rate by detecting the presence or absence of a control bit found in the DDS/SC service but not in the CC64 service. Since the Basic DDS service provides no network defined frames, at each of the possible line rates, the DSU of the present invention monitors the received signal for a plurality of possible invalid conditions. For each line rate, an error counter for that line rate is incremented each time an invalid condition is detected. After all the rates are checked, the present invention selects the line rate of the Basic DDS service with the least number of invalid occurrences.

In testing the prior art DSU units against the commercially available DSU units described in the Background section against a DSU unit incorporating the present invention, applicants discovered that these prior art units failed to correctly select the right line rate, depending upon the length of the transmission line and the data put in, whereas the DSU unit incorporating the present invention did not.

A first aspect of the present invention is directed toward a data communications system including at least a first digital service (DSU) unit and a second DSU unit interconnected by a Digital Data System (DDS) network. The DDS network includes at least a DDS-SC service which provides digital bits in a plurality of network-provided frames at a plurality of line rates. The first DSU unit includes synchronizing means for receiving the network-provided frames from the DDS network and for attempting to establish frame synchronization with the network-provided frames at a first one of the line rates. The first DSU unit further includes selecting means for selecting the line rate as an operating line rate for the first DSU unit to receive the digital data from the second DSU unit if the synchronizing means establishes frame synchronization at the first one of said line rates. The first DSU unit further includes operating means for operating the first DSU unit at the selected operating line rate for receiving the digital data from the second DSU unit.

A second aspect of the present invention is directed toward means for distinguishing between the same line rate that exists in the DDS-SC service and the CC64 service.

A third aspect of the present invention is directed toward a data communications system having at least a DSU unit and a second DSU unit interconnected by a DDS network. The DDS network has at least a Basic DDS service which provides said digital data at a plurality of Basic DDS line rates. The first DSU unit includes error detecting means for receiving a digital signals from the DDS network and for testing, at each of the plurality of Basic DDS line rates, the digital signals for a plurality of types of invalid data conditions. The first DSU unit includes counting means for counting the number of invalid conditions for each of the Basic DDS line rates over a predetermined time period. The first DSU unit further includes selecting means for selecting one of said Basic DDS line rates having the least number of invalid conditions relative to the other Basic DDS line rates as the operating rate for the first DSU unit to receive the digital data from the second DSU unit.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
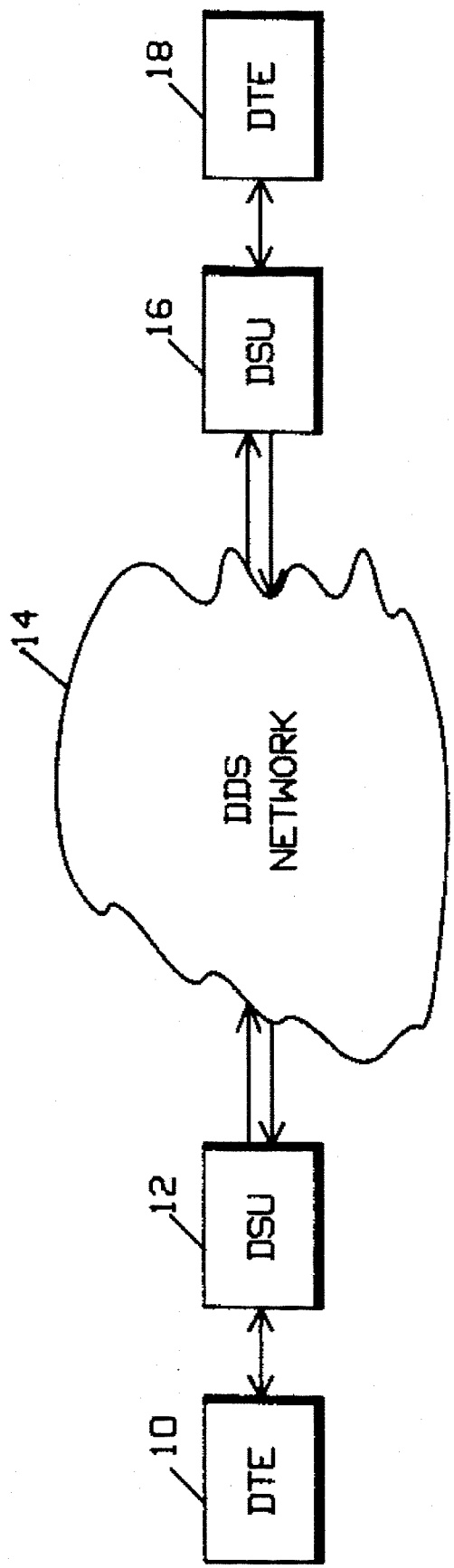
FIG. 1 is a block diagram of an example network utilizing the present invention.

In FIG. 1, there is shown a simple network used to illustrate the overall environment in which the present invention is implemented. A first Digital Service Unit (DSU) unit 10 is used to connect a first Data Transmission Equipment (DTE) unit 12 to a Digital Data System (DDS) network 14, such DDS network 14 being provided by network providers, such as AT&T. A second DSU unit 16 is used to connect a second DTE unit 18 to the DDS network 14. Digital bits to and from the respective DTEs are transmitted to and from the DSUs 12 and 16 via the DDS network 14 in a conventional manner, such digital bits including customer data and control signals. Although FIG. 1 shows a simple point-to-point application of two DSU units, the present invention is also applicable to multipoint applications having at least three DSU units.

Currently, there are three distinctive services possible in the DDS network 14: Basic DDS, DDS-SC (Secondary Channel) and CC64. As currently provided by the service provider AT&T in its Dataphone Digital Services, the first two services operate at a plurality of line rates, the latter service only has a single line rate.

In the DSU units 12 and 16 of the present invention, a software-implemented procedure is used in an elimination process for determining the correct operating network service and operating line rate for that service, such determinations being necessary for the DSU units to receive customer data transmitted between the DSU units through the DDS network 14. First, this service/rate determining procedure is generally described below and secondly, this procedure is described in detail after this general description with respect to the flow chart of FIGS. 2A, 2B and 2C. A modification of this procedure to accommodate multipoint applications is shown in FIG. 3. Although the present invention is implemented in the computer programs ("coding") of the DSUs, the hardware environment is shown in FIG. 4. However, this hardware remains unmodified by the incorporation of the present invention from prior art designs and is merely provided herein to assist in understanding the present invention.

Referring to FIG. 1, the DSU units 12 or 16 of the present invention receives a data stream at their line side port from the other DSU unit 16 or 14, respectively, via the DDS network 14. The present invention is described with respect to digital data that is generated at the DTE unit 18 and is transmitted by the DSU unit 16 so as to be received by the DSU unit 12. However, the same procedure is applicable to data originating at the DTE unit 10 and which is transmitted by the DSU 12 to the DSU 16, since the service/rate determining procedure is preferable, but not necessarily implemented in both DSUs 12 and 16.

A general overview of the service/rate determining procedure of the present invention is hereinafter provided. The service/rate determining procedure of the DSU 12 and DSU 16, preferably, but not necessarily, first examines the received network-provided frames provided by the DDS network to ascertain whether the network service providing the data stream is the DDS-SC service. The DDS-SC service provides a digital signal to the DSU unit 12 which incorporates a plurality of repetitive, distinctive byte frames that are used to define byte boundaries within the data stream. To lock to these network-provided frames, the DSU unit 12 needs to operate at the proper line rate, i.e., synchronize to the repetition rate of the network-provided frames received by the DSU unit 12 so as to provide "frame synchronization". For this DDS-SC service, the DSU unit tries to lock to these frames for each of the following line rates: 3.2 kilobits per second (kbps), 6.4 kbps, 12.8 kbps, 25.6 kbps, and 72 kbps.

If the frames are found, i.e., frame synchronization established, the unit defaults to this DDS-SC service and the line rate at which the frame synchronization was established. If frame synchronization is not established at one line rate, the next rate is tested. A succession of line rates are tested until frame synchronization has been established or all the line rates of the DDS-SC service have been checked. Alternatively, as well be obvious to those skilled in the art, all line rates for the DDS-SC service could be tested prior to selection of a best line rate.

In checking for the DDS-SC service, if frame synchronization is found with a line rate of 72 kbps, the service/rate determining procedure must perform more testing to determine whether this data rate belongs to the DDS-SC service or the CC64 service. The CC64 service is only available with a line rate of 72 kbps and uses the same frame format as in the DDS-SC service for its 72 kbps rate. To detect this CC64 service, the procedure monitors the eighth bit (a control bit) of the data byte of the network provided frames for an active CCS pattern as defined in the AT&T PUB 62310. This active CCS pattern exists in the DD-SSC service, but not the CC64 service. If this CCS pattern is not found, the DDS unit 12 defaults to CC64 service; otherwise, if the CCS pattern is found, the DSU unit 12 selects DDS-SC.

Once all the DDS-SC line rates have been tested and the frame synchronization has not been established, the procedure proceeds to check the next service, Basic DDS service. With the Basic DDS service, there are no network defined frames. Hence, line rate detection using frame synchronization is not possible. For this Basic DDS service, the service/line determining procedure scans through all the line rates for the Basic DDS service, which, as currently provided, include 2.4 kbps, 4.8 kbps, 9.6 kbps, 19.2 kbps, and 56 kbps. For each line rate, an error counter is incremented every time one of a plurality of possible invalid conditions is received and detected. After all the line rates are checked, each for a predetermined time period, the procedure selects the line rate with the least number of invalid conditions, i.e., errors.

The following list contains the conditions that are considered invalid for the Basic DDS service (hereafter referred to as "invalid conditions"):

1. A first type of invalid condition is identified as "unknown bipolar violations" or "invalid bipolar violations". The service/rate determining procedure of the DSUs only recognizes the bipolar violation sequences defined in the AT&T PUB 63210 as valid codes. These valid bipolar sequences correlate with various control signals as will be described hereinafter in the more detailed description of the present invention. Any other received sequence is considered an unknown and invalid violation.
2. A second type of invalid condition occurs if more than six (seven if 56 kbps line rate) consecutive zeroes are received, as defined in the AT&T PUB 62310. Generally, this many zeros are prohibited due to possible loss of timing.

3. A third type of invalid condition occurs if valid bipolar violation(s) or data bytes are received for less than three byte times. In this case, different types of bipolar violations qualify for being counted to meet the required three byte times so as to avoid an invalid condition, i.e., the bipolar violations do not all need to be of the same type. With data bytes, if three data bytes are received, this invalid condition does not occur, whereas if only two data bytes are received, then this invalid condition occurs.

4. A fourth type of invalid condition occurs if a particular valid violation is received, but this particular valid violation is not repeated for at least three byte times. In this case the counted valid violation must be of the same type (such types to be described hereinafter).

With respect to FIGS. 2A, 2B, 2C and 2D, a detailed description of the service/rate determining procedure of the preferred embodiment, generally referred to by numeral 28, is provided hereinafter. Because of the size of the flow chart for this procedure 28, it has been divided up over four sheets of drawings (FIGS. 2A, 2B, 2C and 2D). Additionally, the details of the various DDS networks are provided where such details assist in understanding the present invention. More specifically, the following description first describes one of the three above mentioned DDS services, followed by a description of those portions of the flow charts of FIGS. 2A–2D which are relevant to detecting this DDS service and the line rates contained therein.

DDS-SC SERVICE

As previously mentioned, DDS-SC service has its own, network provided, frame structure imposed by the network. Table 1 below shows the conventional, well known subrate DDS-SC frame format. In this Table, as will be described in more detail hereafter, D1–D6 represents six data bits per frame, F represents a framing pattern bit and S/C represents a shared secondary channel and control bit. The framing pattern used is a repeating 101100 pattern. For 56K DDS S/C, the same frame format is used except for the addition of a D7 bit (seventh data bit after D6 and before F Bit).

TABLE 1

| D1 | D2 | D3 | D4 | D5 | D6 | F | S/C |
|----|----|----|----|----|----|----|-----|

Hence, the DDS-SC (secondary channel) provides primary rate data channel at the of 2.4, 4.8, 9.6, and 56 kbps, with an integrated, operationally independent, subrated (lower speed), second data channel. Hence, the DDS-SC service provides over the customer loop a byte-structured bipolar loop signal operating at loop speeds (line rates) of 3.2, 6.4, 12.8, and 72.0 kbps, as previously mentioned, and does not utilize bipolar violations for transmission of control codes. DDS-SC requires that a byte structure be present in the user's data which allow differentiation of the primary and secondary channels, both at the user's DSUs and in the network.

Referring again to Table 1, information transmitted to the network must be formatted in either 8-bit bytes containing 6 primary channel Data bits, D bits, for network primary channel rates of 2.4, 4.8, and 9.6 kbps or 9-bit bytes, containing 7 primary channel bits for 56 kbps network channel data. Each byte contains two bits which are not primary channel data. One of these contains a framing bit, F bit. The other bit is shared between secondary channel information, S bits, and network control information, C bits, and thus designated C/S bit, as shown by the above table.

Primary channel utilization is determined by various uses of the D and C bits. When the C bit is set to one (1), the primary channel is defined as being in the control mode. While in either mode all D bits may be set to one (1) to indicate that the channel is idle. Any configuration of the D bits other than the idle code will indicate that the channel is active. A combination of the control (C bit=0) and idle (D bits=1) modes is also referred to as a control mode idle (CMI) sequence.

In all of these DDS services, the customer-provided DSU communicates with the DDS network 14. More specifically, the DSUs communicate with an OCU (Office Channel Unit) located in the local access provider's serving central office. Eight OCU speeds are available to match five primary channel DSU speeds. It is the OCU of the DSS network, typically located at a central office, that inserts the F bit prior to the byte frame being provided to the local loop including the DSU; hence, this is the manner in which the DDS network 14 defines or provides the frame.

Figure 2A:
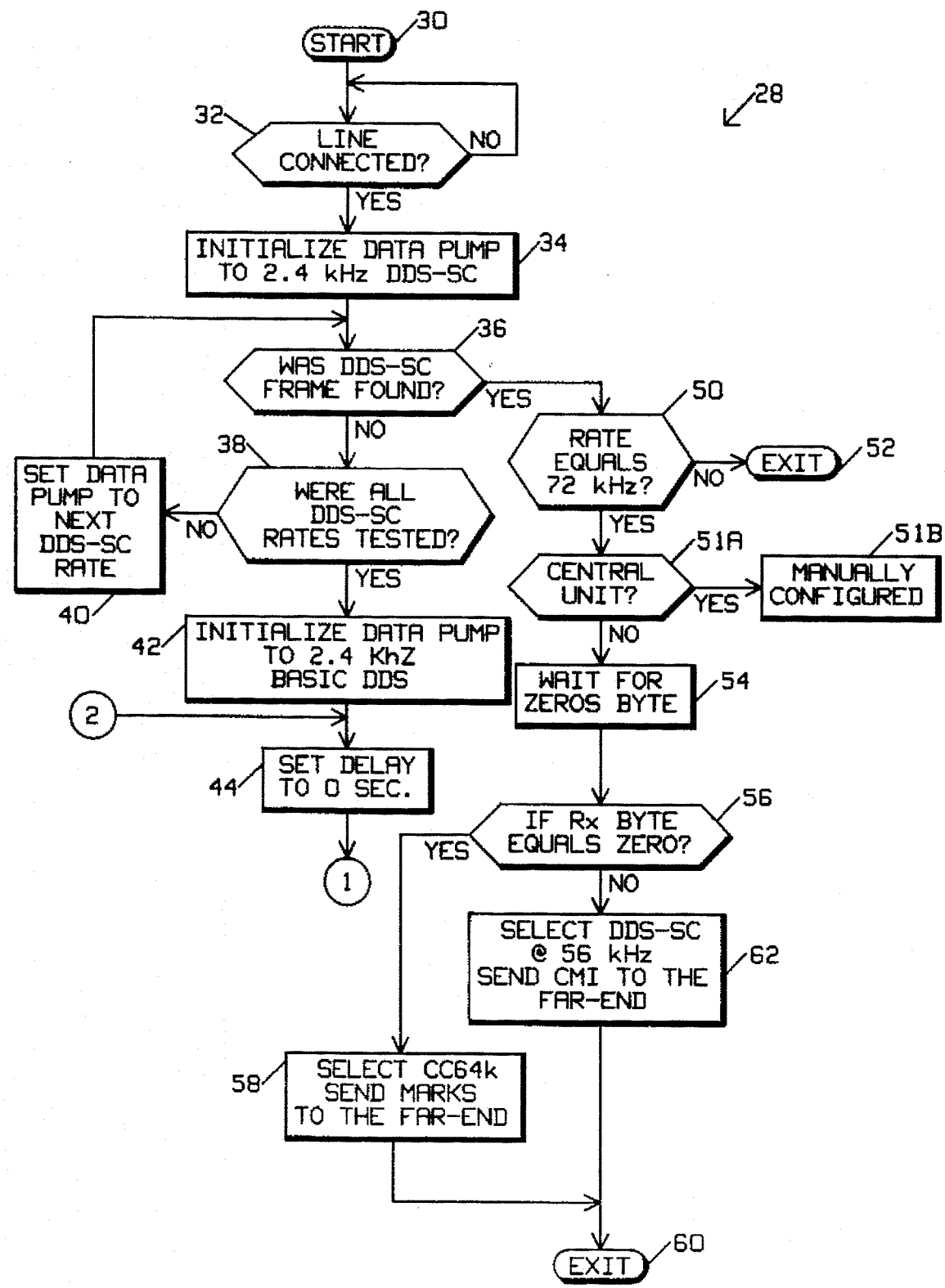
FIG. 2A is a first portion of a flow diagram of a service/rate determining procedure of the present invention.
Figure 3:
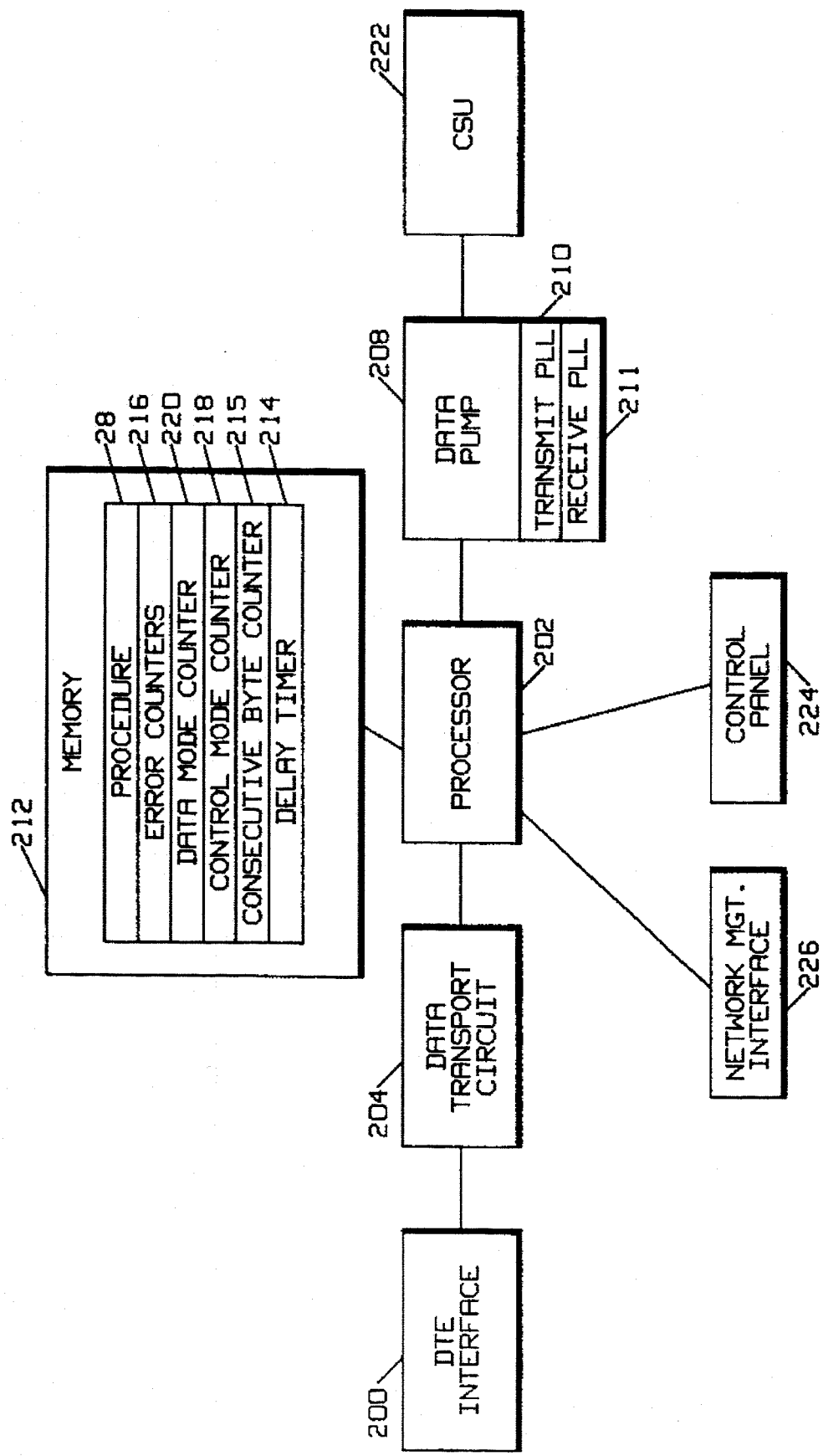
FIG. 3 is a general schematic of a digital service unit (DSU) of the present invention which implements the service/rate procedure of the present invention.

With reference to FIG. 2A, the procedure 28 starts at step 30. After the start step 30, step 32 determines whether there is a connection established for the DSU unit 12 to receive the data stream from the DSU unit 16 via the transmission lines of the DDS network 14, as shown in FIG. 1. If so, step 34 of FIG. 2A initialize the data pump (discussed hereinafter) of the DSU 12 to the line rate of 2.4 KHz of the DDS-SC service. Otherwise, the step 32, as represented by the feedback loop of FIG. 2A, will cause the transmission line to be repeatedly tested at periodical time intervals to determine whether a connection has been established, e.g., in this continuous loop the test is repeated every few microseconds. However, those skilled in the art will recognized that the period between successive tests can be extended. After initializing the data pump at 2.4 kHz, step 36 tests to see if the DDS-SC frame has been found, i.e., whether frame synchronization has been achieved at this line rate. If synchronization has not been achieved, then step 38 determines whether all the DDS-SC line rates have been tested. If not, the data pump is set to the next higher DDS-SC rate by step 40 and control again is passed to step 36 where the new DDS-SC rate is tested to see if frame synchronization is achieved. At step 36, if the DDS-SC frame is found, control is transferred to step 50. Step 50 determines whether or not the line rate equals 72 KHz. If not, the routine terminates at exit step 52. In this case, the DDS-SC line rate has been determined to be something other than 72 KHz, eliminating the need to examine the line rate further.

Step 51A and 51B are only included when there is a possibility of there being a multidrop application. Although the embodiment shown in FIG. 1 describes a point-to-point arrangement of two DSUs, the present invention is also applicable to well known, conventional multidrop (multipoint) applications. With respect to FIG. 1, in a multidrop application, the DSU 12 would be the central site DSU (referred to as a "central DSU") and there would be at least two (only one shown in FIG. 1) remote sites each having the DSU unit 16 (referred to as a "remote DSU") and a DTE unit 18. In a well known manner, the central DSU polls the remote DSUs one at a time so that only one of the remote DSUs transmits data back to the central DSU at a time. The AT&T provided multipoint DATAPHONE® Digital Service provides duplex communication between the central DSU (control station) and two or more remote DSUs (tributary stations), and uses duplex Multipoint Junction Units (MJUs) located at various offices in the DDS network. A customer's interface in the DSUs with multipoint service is the same as that for two-point service as herein described.

When the procedure needs to accommodate such multi-drop applications using the subject invention, the procedure 28 is modified to include steps 51A and 51B. Preferably, but not necessarily, these same changes also are included in the remote DSUs so that the central and remote DSUs can have the same coding. If step 50 determines the rate to be equal to 72K, then the step 51A would determine whether the DSU unit 12 was a central DSU unit or a remote DSU unit. If the answer is yes, then step 51B represents the fact that the operator/user at the central site having the central DSU must manually select the service/line rate. The reason for this manual strapping is that in these multidrop applications, only the remote DSU units can detect the CCS pattern for a resolution of whether a 72K line rate belongs to the DDS-SC service or the CC64 service. This is because, unlike the remote DSUs, the central DSU does not receive the S/C bit but instead receives all marks.

In the multipoint application the remote DSU would answer "no" to the question of step 51A and proceed to step 54. In the point-to-point application, the unit would answer no or steps 51A and 51B would be excluded. In any case, control would pass to step 54.

If at step 50, the line rate is determined to be 72 KHz, then it must be determined whether this line rate correlates with the DDS-SC service or the CC64k clear service, since both of these services have a 72 KHz line rate. At step 54, the DDS unit 12 of FIG. 1 waits for zeros byte (i.e., byte of binary zeros) from the remote DDS unit. Step 56 determines whether or not the received byte is all zeros, i.e., equals zero. If yes, at step 58, the CC64K service is selected and the DDS unit 12 sends all marks (binary ones) to the remote DSU 16 and terminates the routine via step 60. At step 56, if the received byte does not equal zero, then the DDS-SC service is selected at 56 KHz data rate. Of course, because of the framing and control/secondary channel bits, this 56 KHz data rate correlates with a 72 KHz line rate. As appropriate for this service, a conventional command mode idle (CMI) signal is sent to the remote DSU 16 at step 62.

With respect to the CC64 clear service, the term "64 kbps" shall denote this AT&T provided DATAPHONE® Digital Service that provides a high performance 64 kbps data channel operating at a loop speed (line rate) of 72 kbps with no zero data bit constrains or loop bipolar violations.

BASIC DDS

For Basic DDS (also called Standard DDS or DDS-I) service, there is no network imposed frame as for DDS-SC service. In other words, Basic DDS accepts from and delivers to the user (DSUs) a serial stream of data which has no byte structure. Instead, control information is communicated using bipolar violations. The DSU units are described as operating in the "control mode" when the DSU unit is receiving control mode bytes consisting of a plurality of valid bipolar violations listed hereinafter. Likewise, the DSU units are described as operating in the "data mode" when the DSU unit is receiving customer data bytes. The DSU unit knows it is in the control mode when it detects received control mode bytes, i.e., valid bipolar violations. The DSU unit knows it is in the data mode when it is not receiving such control mode bytes. Although the previously mentioned AT&T PUB 62310 publication provides the following information (and is incorporated by reference thereto), a portion of the specifications for Basic DDS transmission found in this publication is hereinafter provided to better understand the present invention. These specifications are directed toward the encoding and decoding requirements that the DSUs must observe in order to operate over a Basic DDS channel.

Basic DDS utilizes a baseband, bipolar return-to-zero signal (referred to as "alternate bipolar format") for transmission over the local loop and is described by the following coding rules:

A. A binary 0 is transmitted as zero volts.
B. A binary 1 is transmitted as either a positive or negative pulse, opposite in polarity to the previous binary 1.

For Basic DDS applications, bipolar violations are used to achieve additional information capacity and provide a convenient way of transmitting network control information. A bipolar violation occurs when the alternate polarity rule is violated. For example, the bipolar rule is violated if the last 1 was transmitted as a positive pulse and the next 1 is also transmitted as a positive pulse. The following notations apply:

0 Denotes zero volts transmitted. (Binary Zero)
B Denotes ±A volts with polarity determined by bipolar rule. (Binary One)
V Denotes ±A volts with polarity in violation of bipolar rule. (Binary One)
X Denotes 0 or B, depending on required polarity of a violation.
N Denotes the bit value is disregarded, and 0 or 1 is acceptable.

With respect to encoding and decoding rules for Basic DDS, the transmitted and received data to and from the DSU, respectively, must use bipolar violations to indicate control information (Idle and Out-of-Service) and Zero Suppression to be compatible with Basic DDS using non-framed loops. The Zero Suppression sequence is necessary since long sequences of zeros do not provide sufficient signal transitions to maintain timing recovery in some network equipment.

Unrestricted insertion of violations in the pulse stream would produce an undesirable dc component. Hence, the above mentioned publication states that a means of solving this problem is to reserve a time slot prior to a violation for application of a binary pulse or no-pulse in such a way that successive violations (V) alternate in polarity. The reserved time slot is designated by the symbol X. The desired polarity alternation of Vs is achieved by assigning a value 0 or B to the X such that the total number of Bs since the last V is odd.

The above mentioned publication further states that if pulses of the same polarity were adjacent, performance would be degraded. Therefore, X and V bits are separated by a zero, resulting in an X0V pattern in each bipolar violation sequence.

The above mentioned publication provides the following transmitting bipolar violation sequences to be used with the Basic DDS network:

A. IDLE SEQUENCE—This sequence may be used for supervisory control purposes. The Idle sequence consists of one or more repetitions of the sequence BBBX0V at 2.4, 4.8, or 9.6 kbps or BBBBX0V at 56 kbps.
B. ZERO SUPPRESSION SEQUENCE—At 2.4, 4.8 or 9.6 kbps, any sequence of 6 consecutive 0s must be encoded as 000X0V; at 56 kbps, any sequence of 7 consecutive 0s must be encoded as 0000X0V.

The above mentioned publication provides for the following receiving bipolar violation sequences:

A. IDLE SEQUENCE—This is the same as the transmitting Idle sequence described above.
B. ZERO SUPPRESSION SEQUENCE—Reception of 000X0V for any speed must be decoded as six 0s.
C. OUT-OF-SERVICE SEQUENCE—This sequence is an indication of trouble in the DDS. It consists of one or more repetitions of the sequence 00BX0V at 2.4, 4.8, or 9.6 kbps or N00BX0V at 56 kbps.

D. OUT-OF-FRAME SEQUENCE—This sequence is an indication of trouble in the DDS. It consists of one or more repetitions of the sequence 0BBX0V at 2.4, 4.8, or 9.6 kbps or N0BBX0V at 56 kbps.

E. LOOP-BACK SEQUENCE—This sequence requests the loop-back of the received signal onto the transmit circuit. It consists of 4 successive repetitions of the sequence 0B0X0V at 2.4, 4.8 or 9.6 kbps or N0B0X0V at 56 kbps.

Referring to FIG. 2A, at step 38, if all the DDS/SC line rates have been tested, the procedure 28 proceeds to test for the Basic DDS service. At step 42, the data pump is initialized to 2.4 KHz line rate of the Basic DDS service. Thereafter, using a software-implemented timer, a delay is set to zero seconds at step 44 and via step 46 control is transferred to step 48 of FIG. 2B. the remainder of the procedure for the Basic DDS service is provided in FIGS. 2B through 2D.

Figure 2B:
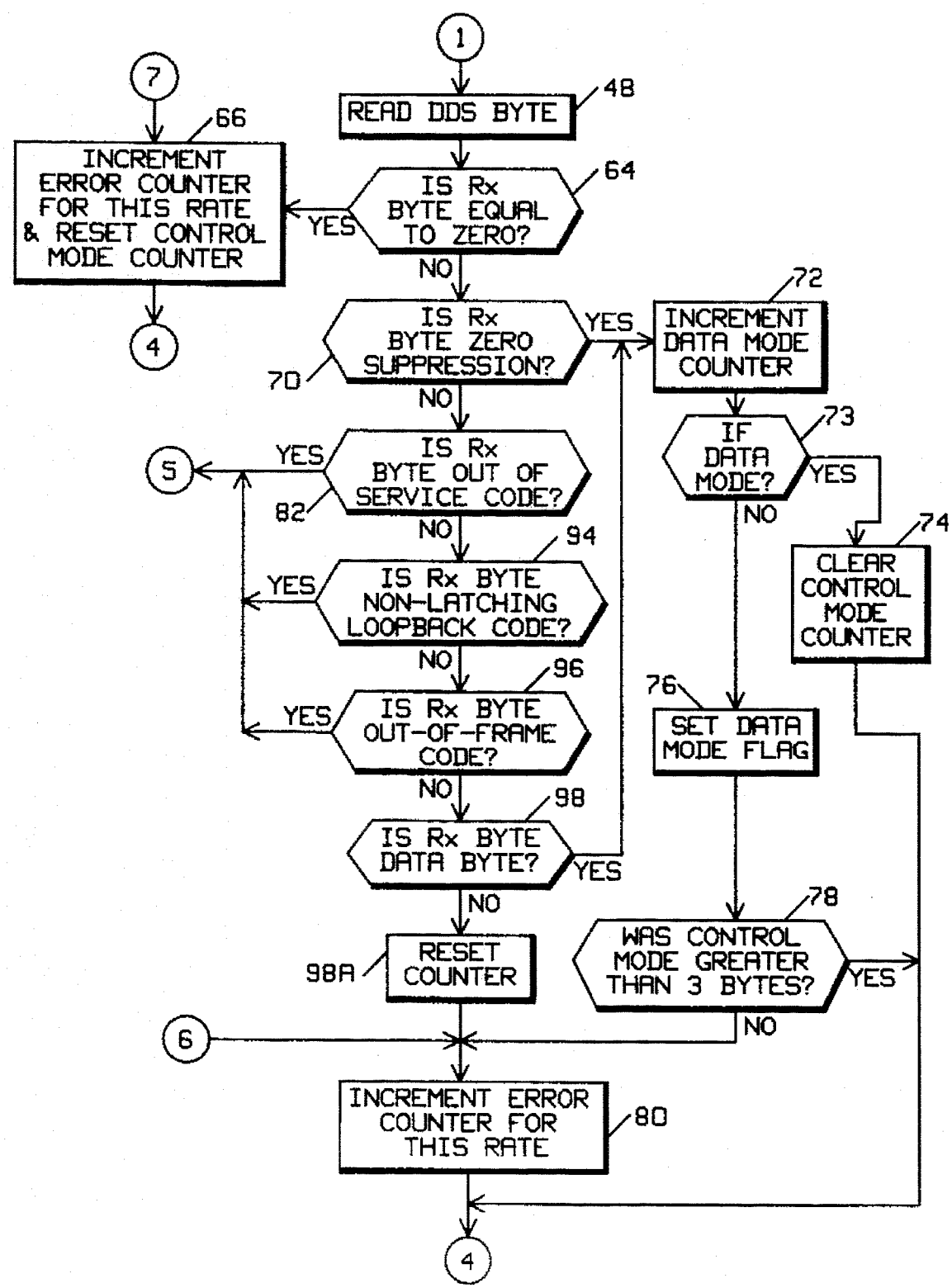
FIG. 2B is a second portion of the flow diagram of the service/rate determining procedure of the present invention.

With reference to FIG. 2B, after the timer is set, control is transferred to step 48. At step 48, the received, Basic DDS byte is read. Step 64 determines whether or not the received Basic DDS byte equals zero (i.e., byte is made up of six binary zeros or, in the case of 56k line rate, all seven bits of the byte are zero). The line rate being examined determines how many zeros are expected in the byte. If they are all zeros (i.e., the previously described second type of "invalid condition"), at step 66, a software-implemented error counter for the line rate being examined is incremented by one and control is transferred to step 68 in FIG. 2D.

At step 64 in FIG. 2B, if the received byte does not equal zero, step 70 determines whether or not the received byte equals the Zero Suppression sequence, which is one of the previously described valid bipolar violations. If so, at step 72, a software-implemented data mode counter is incremented by one. Control is then transferred to step 73 wherein the routine checks to see if a data mode flag has been set. With the DDS service, the "data mode" means that there is transmission of customer data. If the data mode flag has been set (the setting of which will be discussed hereafter), then this means that data from the DSU 16 is being received by the DSU 12 and the procedure 28 clears a software-implemented control mode counter at step 74. The control mode counter (the clearing and incrementing of which is described hereafter) is cleared while the DSU unit is operating in data mode since there are no control mode bytes to count and the control mode counter needs to be reset should the DSU again enter the control mode. After clearing, the procedure 28 proceeds to step 68 in FIG. 2D.

At step 73 of FIG. 2B, if the data mode flag has not been set, control is transferred to step 76 where the data mode flag is set, indicating that the unit is operating in the data mode and receiving customer data. After the data mode flag is set, step 78 examines the control mode counter to see if it has been incremented sufficiently to indicate that at least three valid bipolar violations were received. If at least three valid bipolar violation sequences have not been received (i.e., the third type of "invalid condition" previously described), then at step 80, an error counter for this rate is incremented by one and control is transferred to step 68 of FIG. 2D. At step 78 of FIG. 2B, if there were three or more valid violation characters received, then control is transferred to step 68 of FIG. 2D.

At step 70 of FIG. 2B, if the Zero Suppression sequence is not detected, then control passes to step 82. Step 82 determines if the received byte equals the Out-Of-Service sequence, one of the valid bipolar violations previously described. If so, control passes to step 84 of FIG. 2C where the control code (sequence) byte receive is tested to see if it was equal to the previous control byte, if there was a previous one. If it is the same control byte, then at step 84A a software implemented counter, which indicates the number of consecutive bytes that are the same, is incremented by one. If the control byte is not equal to the previously received control byte, then at step 84B the consecutive equal byte counter is examined to see if its count is less than three, i.e., has received at least three control bytes of the same type. This is the fourth invalid condition described above. If at least three have not been received, then the error counter for the line rate under examination at step 66 of FIG. 2B is incremented by one and the control mode counter is reset to zero to avoid double counting of different invalid conditions for the same received bytes. Additionally, when at least three control bytes of the same type have been received, then at step 84C of FIG. 2C the counter indicating the number of consecutively received equal control bytes is reset.

Figure 2C:
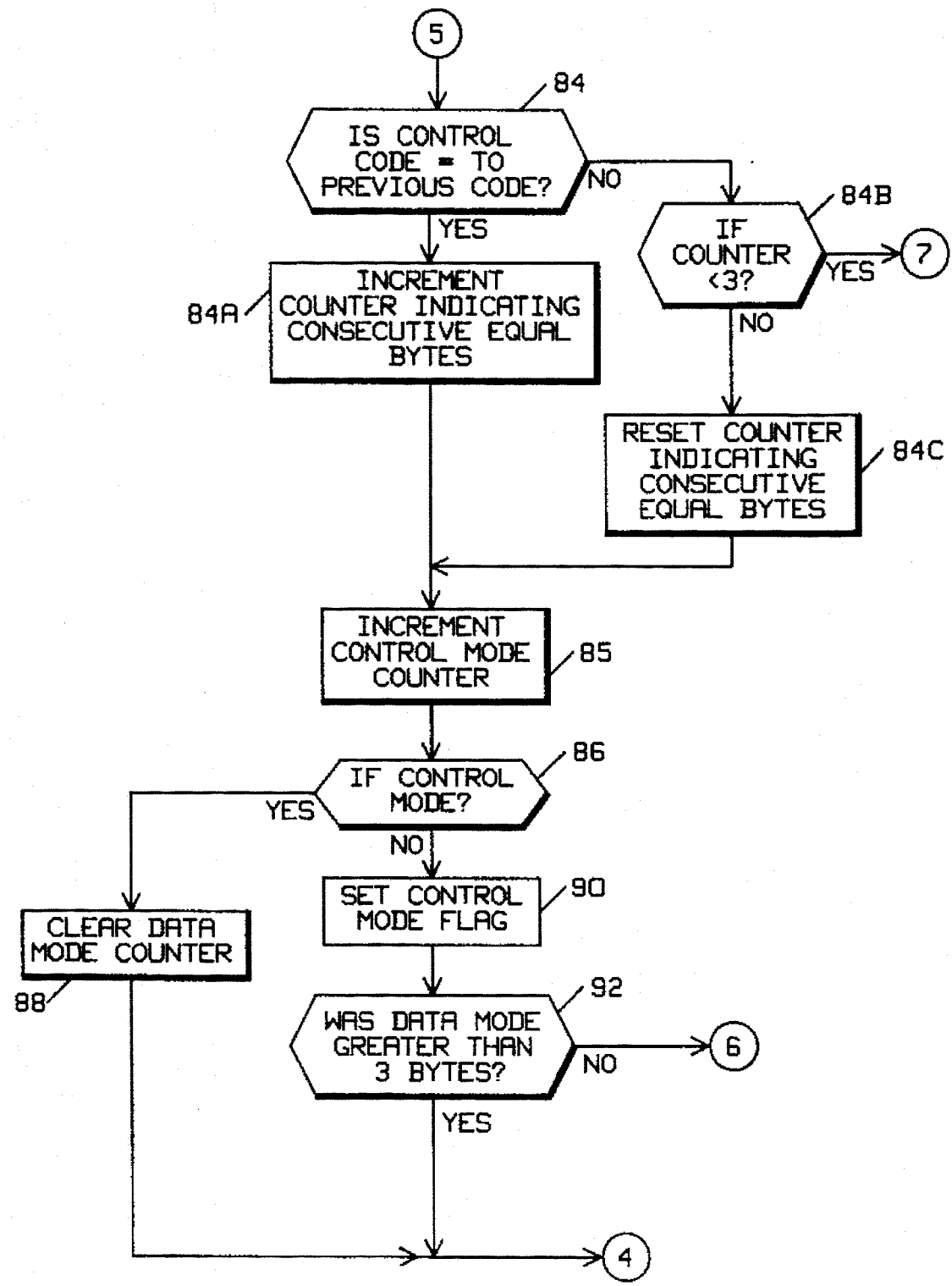
FIG. 2C is a third portion of the flow diagram of the service/rate determining procedure of the present invention.

From either step 84A or step 84C of FIG. 2C control passes to step 85, where the previously mentioned control mode counter is incremented by one, recognizing that the DSU is operating in the control mode. Next, at step 86, the routine checks to see if a control mode flag (the setting of which is described hereinafter) has been set. If it has been set, at step 88, the previously mentioned data mode counter is cleared, based upon the fact that it has been established that the DDS unit is operating in the control mode and the data mode counter needs to be reset to count data bytes should the DSU unit thereafter enter the data mode. If the control mode flag is determined not to have been set at step 86, then the control mode flag is set at step 90, indicating that the unit is operating in the control mode.

Thereafter, step 92 determines whether at least three bytes have been received in the data mode. This is accomplished by reading the previously described data mode counter (which has not yet been reset and is incremented by the previously described step 72) to see if at least three data bytes have been received. If at least three bytes have been received, then control is transferred to step 68 of FIG. 2D. If not, there exists an invalid condition of the previously described third type and control is passed to step 80 of FIG. 2B. At step 80, a software-implemented error counter for the line rate being examined is incremented by one indicating that an error, i.e., invalid condition has occurred.

At step 82 of FIG. 2B, if the Out-Of-Service sequence is not detected, step 94 determines whether the received byte is equal to the non-latching Loop Back sequence, another one of the valid bipolar violations. If so, the procedure 28 branches to step 84 of FIG. 2C. From step 84 of FIG. 2C, this portion of the routine previously has been described. If the non-latching Loop Back sequence is not detected at step 94 of FIG. 2B, then step 96 examines the received byte to see if it equals the Out-Of-Frame sequence. If so, the procedure 28 proceeds to step 84 of FIG. 2C, with this portion of the routine previously having been described.

If the Out-Of-Frame sequence is not detected at step 96 of FIG. 2B, then step 98 examines the received byte to see whether it is a data byte. The routine determines that it is a data byte by the fact that it has none of the previously described, valid bipolar violation sequences. If a data byte is detected, the routine proceeds to step 72, which has previously been described. If the data byte is not detected, then at step 98A the counter indicating consecutive equal bytes is reset to zero. Thereafter, the software counter for this line rate is incremented by one at block 80, which has already been described.

Figure 2D:
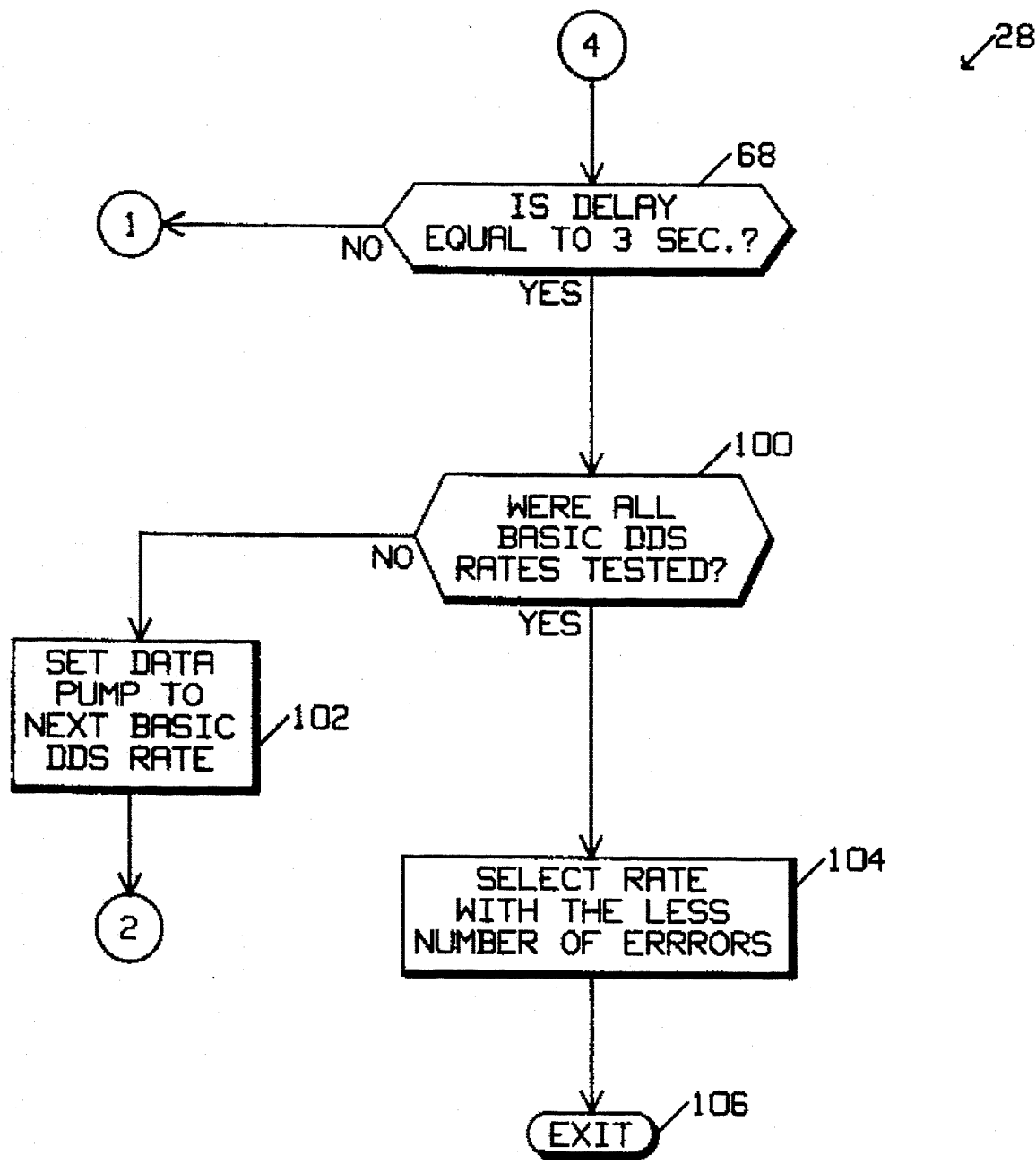
FIG. 2D is a third portion of the flow diagram of the service/rate determining procedure of the present invention.

Step 68 of FIG. 2D determines whether the delay of the previously described software timer, which was set in step 44 of FIG. 2A, is equal to three seconds. If it is not equal to three seconds, control is transferred back to step 48 of FIG. 2B to continue to read received DDS bytes. If the delay equals three seconds, step 100 in FIG. 2D determines whether all the Basic DDS rates have been tested, i.e. the DSU unit has been operated at all of these Basic DDS rates while counting invalid conditions. If not, at step 102 the data pump is set to operate at the next Basic DDS rate and control is transferred back to step 44 of FIG. 2A where the delay timer is reset.

At step 100 of FIG. 2D, if all the basic DDS rates have been tested, step 102 selects the line rate whose corresponding error counter has the least number of errors, i.e., invalid conditions. Then the routine is exited at step 106.

Turning now to FIG. 3, a functional block diagram of a DSU 12 operating as described above is shown. This description is also applicable to the DSU 16. The present invention is entirely implemented in software, i.e., by supplementing and modifying the computer programs of a conventional, well known DSU unit design. Hardware for the DDS unit in which the software procedure of the present invention can be implemented is shown in U.S. Pat. No. 4,745,601 to the assignee of the present invention, which is incorporated herein. Despite this, a brief description of the hardware, along with some of the previously mentioned, software implemented components are provided.

In FIG. 3, the DSU 12 includes a DTE interface 200 for providing suitable attachment of the DTE unit (shown by numeral 10 in FIG. 1) using conventional RS-232 or similar interfacing technology. A processor 202, which is preferably implemented using an Intel 8051 processor, passes data to and from a data transport circuit 204 which is preferably implemented as an Application Specific Integrated Circuit (ASIC). Data transport circuit 204 provides timing and control functions to the processor 202 as well as buffering functions for the data flow. Data passes from the data transport circuit 204 to a data pump 208, implemented with an ASIC, via the processor 202. The data pump 208 includes a conventional transit Phase-Locked Loop (PLL) 210 and receive PLL 211. The data pump 208 is implemented with an ASIC device.

The processor 202 has its associated memory generally shown by block 212. Such memory being preferably implemented in an EPROM for the storage of the procedure 28 shown in FIGS. 2A–2D. Tables and like matters are stored temporarily in RAM. This memory 212 stores the computer programs for operating the processor and for carrying out the procedure 28, such procedure 28 being previously described in detail with respect to FIGS. 2A through 2D. As previously described, this procedure makes use of a software-implemented delay timer 214, which is set to zero after setting the data pump 208 to try to establish frame synchronization at one of the data line rates of the Basic DDS service using the receive PLL 211. (See step 44 in FIG. 2A and step 68 in FIG. 2D.) Invalid conditions for that line rate are counted for preferably 3 seconds, such predetermined time interval being adjustable by setting the timer 214 to empirically found value by the user. During this time interval, the invalid conditions are counted by a plurality of software-implemented error counters 216, with there being one of such counters 216 (see steps 66 and 80 in FIG. 2B) for each of the examined line rates of the Basic DDS service. Each time a new line rate is examined, the data pump 208 tries to establish frame synchronization at that rate using conventional receive PLL 211. Additionally, the control mode counter 218 is used to count control mode bytes while the DSU unit is operating in the control mode (see step 85 of FIG. 2C and steps 74 and 78 in FIG. 2B). The data mode counter 220 is used to count data mode bytes while the DSU unit is operating in the data mode (see step 72 in FIG. 2B and steps 88 and 92 in FIG. 2C). The counter 215 is used to count the number of consecutive control bytes received as described with respect to steps 84, 84A, 84B, 84C of FIG. 2C.

Outgoing data from data pump 208 is passed to a conventional customer service unit (CSU) 222 which also passes incoming data from the digital network (shown by numeral 14 in FIG. 1) to data pump 208. The CSU 222 serves as an interface to the digital network in a conventional manner.

The processor 202 is implemented using an Intel 8051 processor and provides high level system control functions to the DSU to generally oversee configuration and strapping functions, etc. The processor 202 is coupled to a control panel 224 to permit the user to select operational options as well as strap settings, port speeds, etc. The processor 202 is coupled to a network management system interface which permits direct communication to a network management system such as that described in U.S. Pat. No. 4,385,384 to Rosbury et al patent.

The DTE interface 200 implements the requirements of the DTE interface such as synchronous timing for data transfers and operation of control signals to meet interface standards. The data is transferred between this block and the processor 202 by reads and writes to registers in the in the transport circuit 204. The actuation and monitoring of the DTE control signals is also performed by read and write operations to the transport circuit 204 by the processor 202.

The data transport circuit 204 performs the interface function for data and control information. The interfaces to the data transport circuit 204 and the data pump 208 are through read and write registers in the data transport circuit 204 and the data pump 208.

The processor 202 interfaces to the network as well as network management channels. The processor 202 does not alter the customer data fields. The processor 202 extracts/ inserts the network management messages into the data for transport over the digital network. The processor 202 contains configuration information for the unit such as port speeds, etc. It also monitors the operation of other parts of the DSU. It translates information from one form to another when information is passed from one interface to another. For instance high level commands received from the network management interface 226 are translated to low level actions in the DSU such as writing a byte to a hardware register to change the speed of operation of an interface port. Another example is where detection of buttons being pressed on the control panel 224 cause corresponding messages to be displayed on same.

The transmit PLL 210 is used when the unit is supplying the clocking information for the line. External transmit clock from the DTE can be selected for the source of the clocking or the PLL 210 can generate a stable clock internally. The PLL 210 is not used when connecting to the DDS network where the clocking information comes from a stable clock sources in the network.

The receive PLL 211 is used to derive the receive clock from the received data pulses from the DDS receive line from the DDS network. The receive clock is used to clock in the received data. The PPL 211 is of conventional design for deriving a synchronous DDS clock signal from the received DDS data stream. One illustrative design of such a PLL 211 is shown in U.S. Pat. No. 4,745,601 to the present assignee. U.S. Pat. No. 4,745,601 is incorporated herein.

It should be appreciated that the subject invention can be used in network environments where not all of the services and line rates are available, thereby simplifying the service/rate determination procedure. For example, one implementation this procedure is in a network environment wherein it is assumed that the DSU unit does not operate over the DDS-SC service, so if the unit determines that the line rate is 72 kbps, the procedure is simplified in that the unit defaults to the CC64 service. It will also be appreciated by those skilled in the art that this procedure can be extended to cover additional services and line rates as they become available to network users. It should be appreciated by those skilled in the art that if separate coding is used at the central and remote DSUs in the multipoint application, only the handshake portion of this supplemental coding is necessary, and there is no need to check to see if there is a central unit.

Additionally, it will be appreciated by those skilled in the art that not all valid bipolar sequences need to be detected if not used and new ones may be provided by the DDS service. Hence, the subject invention is equally applicable to detecting valid bipolar violations other than those specified herein and is equally applicable to detecting a subset of the valid bipolar violations specified herein.

Moreover, although it is clearly preferable to examine the DDS-SC service first in the service/rate determining procedure of FIGS. 2A–2D, it is clearly within the scope of the present invention to first examine the received digital signal from the DDS network with respect to the Basic DDS and if a line speed is not located with a predetermined low number of invalid conditions, then examine the line rates of the Basic DDS. However, due to the frame synchronization analysis for the DDS-SC being more definitive than the counting of invalid conditions of the Basic DDS analysis, it is clearly advantageous to examine the DDS-SC line rates first. Additionally, with respect to the DDS-SC service, the order in which the different line rates are tested can be varied. Alternatively, as well be obvious to those skilled in the art, all line rates for the DDS-SC service could be tested prior to selection of a best line rate.

The present invention may be implemented in a number of ways, as will be clear to those skilled in the art. Of course, those skilled in the art will appreciate that while this arrangement is preferred, it is not intended to be limiting as other arrangements of the frame are possible.

What is claimed is:

1. A method of data communications using at least a first digital service (DSU) unit and a second DSU unit interconnected by a Digital Data System (DDS) network; said DDS network including at least a DDS-SC service which provides digital data in a plurality of DDS-SC network-provided frames at a plurality of DDS-SC line rates, the improvement in said method including the steps of:

said first DSU unit receiving said DDS-SC network-provided frames from said DDS network and attempting to establish frame synchronization with said network-provided frames at a first one of said DDS-SC line rates;

said first DSU unit selecting the first one of said DDS-SC line rates as an operating line rate for said first DSU unit if said frame synchronization is established at said first one of said DDS-SC line rates; and operating said first DSU unit at said selected operating line rate to receive said digital data from said second DSU unit;

attempting to establish frame synchronization with said DDS-SC network-provided frames at successive DDS-SC line rates until said frame synchronization has been established or all of said plurality of DDS-SC line rates have been tested; and said DDS network further includes a CC64 service which provides said digital data in a plurality of CC64 network-provided frames at a common line rate; said DDS network provides one of said DDS-SC network-provided frames or CC64 network-provided frames to said first DSU unit; one of said DDS-SC line rates being said common line rate and each of said DDS-SC network-provided frames includes a control bit; and said CC64 network-provided frames do not include said control bit; and wherein said step of selecting further includes determining, upon receiving said common line rate, an operating service by ascertaining whether received network-provided frames belong to said DDS-SC service or said CC64 service based upon the presence or absence of said control bit, respectively; and operating said first DSU unit in accordance with receiving said digital data from said ascertained operating service.

2. The method according to claim 1, wherein said DDS network further comprises providing a Basic DDS service; said Basic DDS service being operable to provide digital signals at a plurality of Basic DDS line rates without network-provided frames and further comprising at said first DSU unit the steps of:

receiving said digital signals from said DDS network and testing, at each of said plurality of Basic DDS line rates, said digital signals for a plurality of types of invalid data conditions;

counting the number of invalid conditions for each of said Basic DDS line rates over a predetermined time period; and selecting one of said Basic DDS line rates having the least number of invalid conditions relative to the other said Basic DDS line rates as the operating rate for said first DSU unit to receive said digital data from said second DSU unit.

3. A method of data communications using at least a first digital service (DSU) unit and a second DSU unit interconnected by a Digital Data System (DDS) network so as to transport digital data between said DSU units; said DDS network having at least a Basic DDS service which provides digital signals at a plurality of Basic DDS line rates, and a DDS-SC service having a plurality of DDS-SC line rates and providing a plurality of DDS-SC network-provided frames for said digital signals at each of said DDS-SC line rates; the improvement in said method comprising the steps of:

said first DSU unit receiving said digital signals from said DDS network and testing, at each of said plurality of Basic DDS line rates, said digital signals for a plurality of types of invalid data conditions;

said first DSU unit counting the number of invalid conditions for each of said Basic DDS line rates over a predetermined time period;

said first DSU unit selecting one of said Basic DDS line rates having the least number of invalid conditions relative to the other said Basic DDS line rates as the operating rate for said first DSU unit to receive said digital data from said second DSU unit;

said first DSU unit for receiving said digital signals from said DDS network and for attempting to establish frame synchronization with said digital signals at a first one of said DDS-SC line rates;

said first DSU unit being operable for selecting the first one of said DDS-SC line rates as said operating line rate for said first DSU unit and for selecting said Basic DDS as an operating service for said first DSU unit if said frame synchronization is established at said first one of said DDS-SC line rates; and operating said first DSU unit at said selected operating service for receiving said digital data from said second DSU unit; and said DDS network further includes a CC64 service which provides said digital signals in a plurality of CC64 network-provided frames at a common line rate and without a control bit and wherein one of said DDS-SC line rates is the same as said common line rate of said CC64 service and said DDS-SC network-provided frames for said DDS-SC service includes said control bit; and said method further comprising the step of:

said first DSU determining, upon receiving said common line rate, said operating service by ascertaining whether said digital signals belong to said DDS-SC service or said CC64 service based upon the presence or absence respectively of said control bit.

4. The method according to claim 3, wherein one of said invalid conditions comprises said digital signals having an invalid bipolar violation.

5. The method according to claim 3, wherein one of said invalid conditions comprises said digital signals having more than a predetermined number of consecutive zeroes.

6. The method according to claim 3, wherein one of said invalid conditions comprises said digital signals including one or more valid bipolar violations of any type for less than three byte times.

7. The method according to claim 3, wherein one of said invalid conditions comprises said digital signals including one or more data bytes for less than three byte times.

8. The method according to claim 3, wherein one of said invalid conditions comprises said digital signals including a particular valid violation that is not consecutively repeated for at least three byte times.

9. The method according to claim 3, further comprising the step of:

attempting to establish frame synchronization on said digital signals at successive DDS-SC line rates until said frame synchronization has been established or all of said plurality of DDS-SC line rates have been tested.

10. A method of data communications using a central site digital service unit (DSU) and first and second remote DSU units interconnected by a Digital Data System (DDS) network; said first and second remote DSU units connected in a multidrop configuration, said DDS network including a DDS-SC service which provides digital data in a plurality of DDS-SC network-provided frames at a plurality of line rates and a CC64 service which provides digital data at a line rate which is equal to one of the plurality of line rates found in the DDS-SC service, the method comprising the steps of:

providing digital data to the Digital Data System;

determining the line rate of the digital data;

determining if the digital data is being received at the central site DSU; and manually configuring the central site DSU to operate using the DDS-SC service or the CC64 service if the digital data is being received at the central site DSU and if the line rate at which the digital data is being received at the central site DSU is equal to a predetermined line rate.

11. A method as defined in claim 10, wherein the predetermined line rate is 72 kilobits per second.

12. A method of data communications using at least a first digital service (DSU) unit and a second DSU unit interconnected by a Digital Data System (DDS) network so as to transport digital data between said DSU units; said DDS network having at least a Basic DDS service which provides digital signals at a plurality of Basic DDS line rates, a DDS-SC service having a plurality of DDS-SC line rates and providing a plurality of DDS-SC network-provided frames for said digital signals at each of said DDS-SC line rates, and a CC64 service which provides said digital signals in a plurality of CC64 network-provided frames at a common and without a control bit and wherein one of said DDS-SC line rates is the same as said common line rate of said CC64 service and said DDS-SC network-provided frames for said DDS-SC service includes said control bit, said method comprising the steps of:

at said first DSU:

(a) receiving digital signals from said second DSU;

(b) attempting to establish frame synchronization with said digital signals at one of said DDS-SC line rates;

(c) determining if the DDS-SC line rate at which frame synchronization is achieved is equal to a predetermined line rate if in step (b) frame synchronization is achieved;

(d) determining if one of the digital signals received includes a byte of information having all zeros (zeros byte);

(e) selecting the CC64 service for use by the first DSU if the zeros byte is received in step (d) or selecting the DDS-SC service if the zeros byte is not received; and (f) selecting the Basic DDS service if frame synchronization is not achieved in step (b).

13. A method of data communications as defined in claim 12, wherein the predetermined line rate for step (c) is 72 kilobits per second.

* * * * *